A. R. PRIBIL.
PISTON.
APPLICATION FILED DEC. 26, 1916.
1,282,936.
Patented Oct. 29, 1918.
2 SHEETS—SHEET 1.
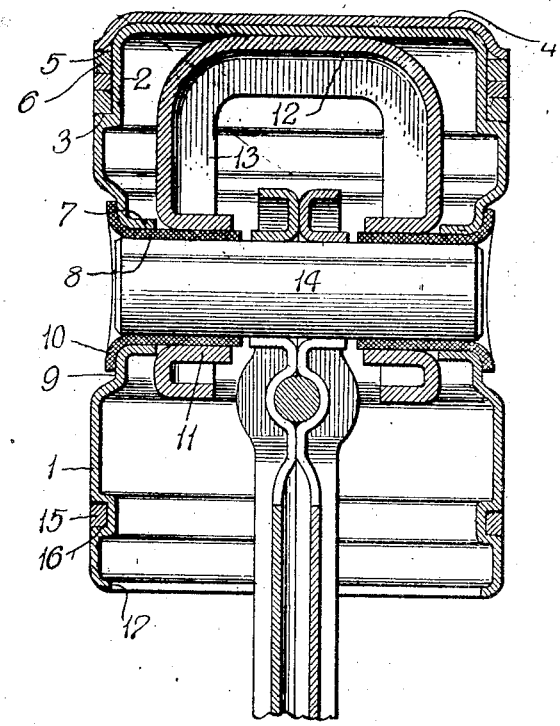
Fig. 1.
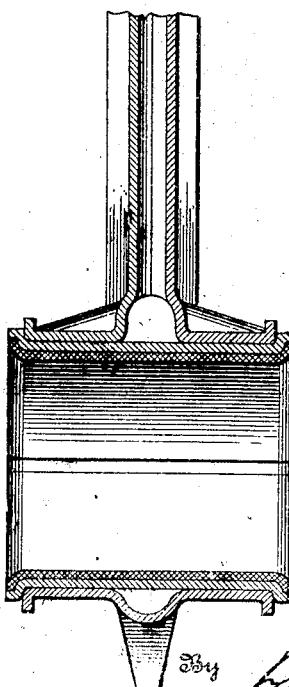
Witness
Chas. W. Stauffer
Karl H. Butler
Inventor
Alexis R. Pribil
By
Attorneys

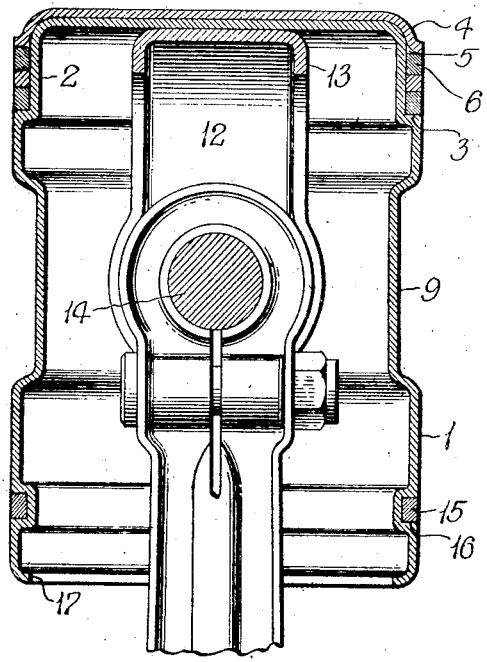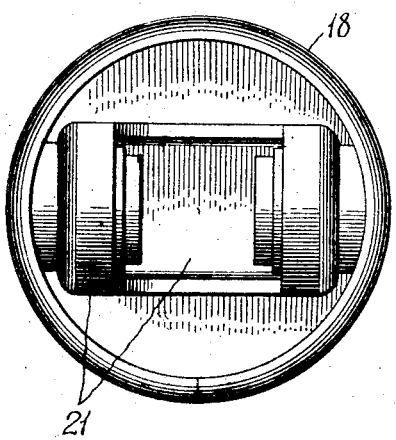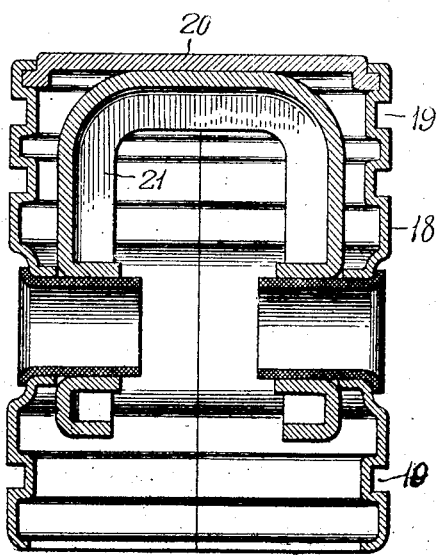

UNITED STATES PATENT OFFICE.

ALEXIS R. PRIBIL, OF WILKINSBURG, PENNSYLVANIA.

PISTON.

1,282,936.   Specification of Letters Patent.   Patented Oct. 29, 1918.

Application filed December 26, 1916. Serial No. 138,956.

*To all whom it may concern:*

Be it known that I, ALEXIS R. PRIBIL, a citizen of the United States of America, residing at Wilkinsburg, in the county of Allegheny and State of Pennsylvania, have invented certain new and useful Improvements in Pistons, of which the following is a specification, reference being had therein to the accompanying drawings.

This invention relates to pistons, and more particularly to a piston body made of a single piece of pressed steel in contradistinction to piston bodies that are cast from metal.

The primary object of my invention is to provide a pressed steel piston body or shell wherein positive and reliable means are employed, as hereinafter set forth, for transferring compression strains direct to the connecting rod of the piston, instead of the pressed steel body or piston skirt, thus utilizing the body or shell more as a guide and lubricating means.

Another object of my invention is to provide a piston of the above type with a pin support adapted to coöperate with the walls of the pressed steel piston body in supporting the pin bearings and a piston pin by which the piston body may be connected to a connecting rod, for instance of that type disclosed by my companion application filed under even date.

A further object of this invention is to provide a simple durable and inexpensive pressed steel piston body with inset pin bearing holders affording lubricant pockets in the side walls of the piston body, so that the piston pin or parts thereon may be thoroughly lubricated and a lubricant seal maintained between the piston and cylinder walls.

A still further object of my invention is to provide a pressed steel piston body in connection with which various types of piston rings may be used, and throughout the construction of the piston body, I have aimed to provide for thorough radiation of heat so that the piston will remain as cool as possible during reciprocation in a cylinder.

A still further object of my invention is to provide piston bodies that are light and uniform in weight, smooth running and capable of running idle without leakage and smoking about an engine.

Furthermore, my invention allows metals to be used in piston constructions that were heretofore impossible for a good piston.

The above and other objects are attained by constructions that will be hereinafter specifically described and then claimed, and reference will now be had to the drawing, wherein—

Figure 1 is a vertical cross sectional view of a piston in accordance with my invention;

Fig. 2 is a vertical transverse sectional view of the same;

Fig. 3 is a similar view of a modified form of piston, and

Fig. 4 is a bottom plan of the same.

In the drawing, the reference numeral 1 denotes a pressed steel hollow piston body having the upper or outer end thereof reduced, as at 2, to provide an annular seat or shoulder 3. Brazed, spot welded, shrunk or otherwise secured to the reduced end 2 of the body 1 is a retainer shell 4, somewhat in the form of a cap, said shell having the peripheral edges thereof confronting the seat or shoulder 3 to coöperate therewith in providing an annular groove or way 5 for piston rings 6. The rings 6 are fixed or loose relative to the reduced end 2 of the piston body and of any conventional form.

Diametrically opposed walls of the body 1 are provided with inset tubular holders 7 for pin bearings 8, and the annular inset portion of the piston body provides lubricant pockets 9 at the outer ends of the holders 7 and the bearings 8. The bearings 8 may be fixed within the holders 7 and limiting the inward movement of said bearings are flanges 10 on the outer ends thereof. The bearings 8 are of a greater length than the holders 7 and the inner confronting ends thereof extend into tubular bearings 11 forming part of a yoke or inverted U-shape pin support 12 mounted in the piston body and suitably connected to the reduced end 2 thereof. The yoke or support 12 coöperates with the reduced end of the piston body and the retainer shell or cap 4 in providing a three-ply thickness centrally of the piston head and said yoke is made of a thicker or heavier material than the piston body, and to stiffen and add rigidity to said yoke or supports, the side edges thereof are flanged, as at 13, with the flange surrounding the bearings 11, as shown in Fig. 1. With the yoke so made and disposed, it serves a number of purposes:—first, it distributes compression strain from the three-ply head to the connecting rod of the piston; second, it provides radiating means for heat, and third, it allows light metal to be used for the body or skirt of the piston.

Besides the yoke or support 12 coöperating with the holders 7 in retaining the bearings 8 in position to receive a piston pin 14, said yoke or support disseminates heat in the piston body by radiating the same, thus reducing expansion and contraction to a minimum. This insures more accurate fitting of the piston body relative to the walls of the cylinder, and coöperating with the piston ring 6 is another ring or rings 15 arranged in an annular groove or grooveway 16 in the lower or inner end of the piston body. The groove or way 16 may be rolled or otherwise pressed in the body, and it is preferable to provide the inner end of the body with an inturned flange 17.

In Figs. 3 and 4, a piston body or shell 18 is made from flat hot-rolled blue annealed open-hearth steel and when rolled is provided with the necessary grooves 19 and inturned or flanged edges. The flat stock can then be given a cylindrical form and the longitudinal edges buttwelded or otherwise joined, thus forming a piston shell in a few operations that possesses all the qualifications of a good piston body.

When producing the piston body a head 20 is inserted and locked in position and this head is made of a heavier material than the piston body, so, also, a yoke or pin support 21 in said body and connected to said head. Otherwise, the bearings and other parts are as heretofore mentioned.

What I claim is:—

1. A piston of the type described comprising a body provided with tubular holders and an outer permanently closed end, and heat radiating means in spaced relation to the wall of said body, and having a flat wide bearing on the closed end of said body and provided with bearings alining with the tubular holders of said body.

2. A piston of the type described comprising a body having diametrically opposed walls thereof provided with inset tubular holders affording pockets in the walls of the piston body, and an inverted U-shaped flanged support in said piston body having bearings alining with the tubular holders of said piston body and said bearings surrounded by the flanges of said support.

3. A piston of the type described comprising a body having an outer reduced end, a retaining shell on the reduced end of said body coöperating therewith in providing a ringway, inset tubular holders carried by diametrically opposed walls of said body and providing lubricant pockets in said walls, and a support in said body connected to the reduced end thereof and provided with bearings alining with said tubular holders.

In testimony whereof I affix my signature in the presence of two witnesses.

ALEXIS R. PRIBIL.

Witnesses:
KARL H. BUTLER,
ANNA M. DORR.